UNITED STATES PATENT OFFICE.

MAX ENGELMANN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

PHARMACEUTICAL PRODUCTS.

1,034,092.  Specification of Letters Patent.  Patented July 30, 1912.

No Drawing.  Application filed October 6, 1910.  Serial No. 585,707.

*To all whom it may concern:*

Be it known that I, MAX ENGELMANN, doctor of philosophy, chemist, citizen of the German Empire, residing at Elberfeld, Germany, have invented new and useful Improvements in New Pharmaceutical Products, of which the following is a specification.

An earlier application relates to the preparation of easily soluble compounds derived from the ortho-oxy-mercuric compound of salicylic acid anhydrid (hydrargyrum salicylicum) which are prepared from the known ortho-oxy-mercuric-salicylic acid anhydrid (hydrargyrum salicylicum of the *German Pharmacopœia*) by treating it with alkali and an imino compound containing in addition to the imino radical a group imparting an acid character to the compound, or with the alkali salts of such an imino compound. I have now found that in this process other oxymercuric carboxylic acid compounds, especially oxymercuric carboxylic acids and their anhydrids can be used instead of the salicylate of mercuric oxid *e. g.* the oxymercuric benzoic acid anhydrid (see *Berichte der Deutschen Chemischen Gesellschaft* 35 p. 2870). The new compounds thus obtained which contain in their molecule the characteristic group:

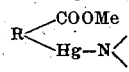

in which Me means "metal" and R an aromatic nucleus, are whitish odorless compounds which are very easily soluble in water and insoluble in ether. They have proved to be valuable antisyphilitica characterized by a mild action and as they are not irritating and not corrosive they are highly valuable for internal application especially for subcutaneous injection. They contain the mercury so firmly combined that on adding a diluted solution of caustic alkali or a cold solution of ammonium sulfid no precipitate is obtained. A solution of from 0.1–0.2 grams may be used for one subcutaneous injection.

In order to illustrate the new process more fully the following examples are given, the parts being by weight: 170 parts of the oxymercuric meta-oxy-benzoic acid anhydrid (obtainable by heating mercuric oxid with meta-oxy-benzoic acid) are added to a solution of 100 parts of the sodium salt of diethylbarbituric acid in 1000 parts of water. The resulting solution is filtered and the filtrate is evaporated *in vacuo*. A whitish crystalline compound separates in crystals. It is easily soluble in water with a neutral reaction; insoluble in alcohol, ether, benzene, acetone and chloroform and is probably produced in accordance with the following equation:

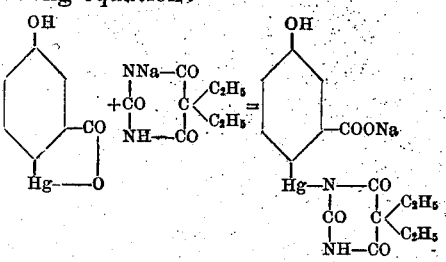

360 parts of the oxymercuric-ortho-chlorobenzoic acid anhydrid having most probably the formula:

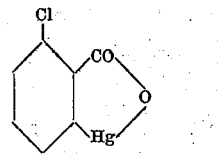

are mixed with 1000 parts of normal NaOH and 113 parts of the imid of glutaric acid are added. After one hour the solution is filtered and the filtrate is evaporated. The new compound separates in crystals. The whitish product is easily soluble in water, insoluble in alcohol, ether and benzene and is probably produced in accordance with the following equation:

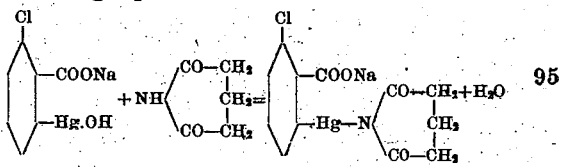

Other imino compounds, such as succinic imid, mono-ethyl-barbituric acid, dipropyl-barbituric acid, etc., may be used or other oxymercuric carboxylic acids or their anhydrids, *e. g.* oxymercuric-naphthol-carboxylic acid anhydrid having most probably the formula:

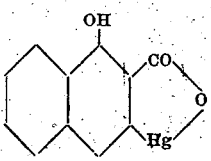

the mercuric salt of the sulfoanthranilic acid anhydrid, which can be obtained by treating acetyl-sulfo-anthranilic acid with HgO and glacial acetic acid, or of nitrobenzoic acid anhydrid, etc.

I claim:—

1. The new mercury compounds containing in their molecule the characteristic group:

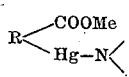

in which Me stands for "metal", and R for an aromatic radical unsubstituted by hydroxyl in ortho-position to the —CO— group which compounds are whitish powders easily soluble in water and insoluble in ether, and containing the mercury so firmly combined that the aqueous solutions do not give any precipitate on the addition of dilute caustic soda lye or a cold solution of ammonium sulfid; and being valuable therapeutics, substantially as described.

2. The new mercury compounds containing in their molecule the characteristic group

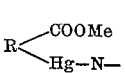

in which Me stands for metal, and R for an aromatic nucleus substituted in meta-position to the —CO group, which compounds are whitish powders, easily soluble in water and insoluble in ether, and containing the mercury so firmly combined that the aqueous solutions do not give any precipitate on the addition of dilute caustic soda lye or a cold solution of ammonium sulfid; and being valuable therapeutics, substantially as described.

3. The new mercury compounds containing in their molecule the characteristic group

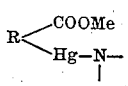

in which Me stands for metal, and R for an aromatic nucleus substituted by —OH in meta position to the —CO group, which compounds are whitish powders, easily soluble in water and insoluble in ether, and containing the mercury so firmly combined that the aqueous solutions do not give any precipitate on the addition of dilute caustic soda lye or a cold solution of ammonium sulfid; and being valuable therapeutics, substantially as described.

4. The new mercury compounds containing in their molecule the characteristic group

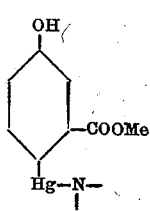

in which Me stands for metal, which compounds are whitish powders, easily soluble in water and insoluble in ether, and containing the mercury so firmly combined that the aqueous solutions do not give any precipitate on the addition of dilute caustic soda lye or a cold solution of ammonium sulfid; and being valuable therapeutics, substantially as described.

5. The new mercury compounds containing in their molecule the characteristic group

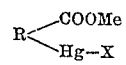

in which Me stands for metal, X for the radical of a barbituric acid, and R for an aromatic nucleus substituted in meta-position to the —CO group, which compounds are whitish powders, easily soluble in water and insoluble in ether, and containing the mercury so firmly combined that the aqueous solutions do not give any precipitate on the addition of dilute caustic soda lye or a cold solution of ammonium sulfid; and being valuable therapeutics, substantially as described.

6. The new mercury compounds containing in their molecule the characteristic group

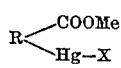

in which Me stands for metal, X for the radical of a barbituric acid and R for an aromatic nucleus substituted by —OH in meta-position to the —CO group, which compounds are whitish powders, easily soluble in water and insoluble in ether, and containing the mercury so firmly combined that the aqueous solutions do not give any precipitate on the addition of dilute caustic soda lye or a cold solution of ammonium sulfid; and being valuable therapeutics, substantially as described.

7. The new mercury compounds containing in their molecule the characteristic group

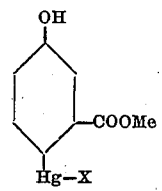

in which Me stands for metal and X for the radical of a barbituric acid, which compounds are whitish powders, easily soluble in water and insoluble in ether, and containing the mercury so firmly combined that the aqueous solutions do not give any precipitate on the addition of dilute caustic soda lye or a cold solution of ammonium sulfid; and being valuable therapeutics, substantially as described.

8. The new mercury compound having most probably the following molecular formula:

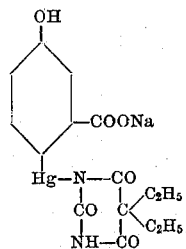

being a whitish powder, easily soluble in water but insoluble in ether, and containing the mercury so firmly bound that its aqueous solution does not give any precipitate on the addition of dilute caustic soda lye or a cold solution of ammonium sulfid; and being a valuable therapeutic, substantially as described.

In testimony whereof I have hereunto set my hand in the presence of two subscribing witnesses.

MAX ENGELMANN. [L. S.]

Witnesses:
CHAS. J. WRIGHT,
WALTER VONNEGUT.